United States Patent
Kakino et al.

(10) Patent No.: US 6,650,960 B2
(45) Date of Patent: Nov. 18, 2003

(54) MACHINING CONTROL SYSTEM

(75) Inventors: Yoshiaki Kakino, 256-5, Iwakura-hanazono-cho, Sakyo-ku, Kyoto-shi, Kyoto 606-0024 (JP); Tomonori Sato, Tokyo (JP); Makoto Fujishima, Nara (JP); Hisashi Otsubo, Okayama (JP); Hideo Nakagawa, Hyogo (JP); Yoshinori Yamaoka, Niwa-gun (JP)

(73) Assignees: Yoshiaki Kakino, Kyoto (JP); Mitsubishi Denki Kabushiki Kaisha, Tokyo (JP); Mori Seiki Co., Ltd., Yamatokoriyama (JP); Yasda Precision Tools K.K., Asaguchi-gun (JP); Osaka Kiko Co., Ltd., Osaka (JP); Yamazaki Mazak Kabushiki Kaisha, Niwa-gun (JP)

( * ) Notice: Subject to any disclaimer, the term of this patent is extended or adjusted under 35 U.S.C. 154(b) by 40 days.

(21) Appl. No.: 09/800,521

(22) Filed: Mar. 8, 2001

(65) Prior Publication Data
US 2001/0027354 A1 Oct. 4, 2001

(30) Foreign Application Priority Data
Mar. 9, 2000  (JP) .......................................... 2000-065279

(51) Int. Cl.$^7$ .............................................. G06F 19/00
(52) U.S. Cl. ......................... 700/173; 700/28; 700/108
(58) Field of Search .......................... 700/173, 28, 169, 700/108

(56) References Cited

U.S. PATENT DOCUMENTS

| | | | | | |
|---|---|---|---|---|---|
| 4,279,013 A | * | 7/1981 | Cameron et al. | ............. | 700/33 |
| 4,833,617 A | * | 5/1989 | Wang | .......................... | 700/173 |
| 5,822,212 A | * | 10/1998 | Tanaka et al. | .............. | 700/174 |
| 6,019,506 A | * | 2/2000 | Senda | .......................... | 374/55 |
| 6,298,279 B1 | * | 10/2001 | Shimada et al. | ............. | 700/182 |
| 6,400,998 B1 | * | 6/2002 | Yamazaki et al. | ........ | 318/568.1 |
| 6,438,445 B1 | * | 8/2002 | Yoshida et al. | .............. | 700/173 |

FOREIGN PATENT DOCUMENTS

| | | |
|---|---|---|
| JP | 62-292347 | 12/1987 |
| JP | 2-218538 | 8/1990 |
| JP | 6-8106 | 1/1994 |
| JP | 7-41516 | 5/1995 |

* cited by examiner

*Primary Examiner*—Leo Picard
*Assistant Examiner*—Alexander Kosowski
(74) *Attorney, Agent, or Firm*—Leydig, Voit & Mayer, LTD

(57) ABSTRACT

A machining control system maintaining optimum machining states and enhancing efficiency and reliability even when an actual machining environment fluctuates. The machining control system includes a machining information determination portion for determining initial machining conditions on the basis of information stored in a machining data base and in accordance with adaptive control characteristics defined by adaptive control modes and adaptive control parameters, and an adaptive control portion for controlling machining by changing the machining conditions in accordance with the machining states observed during machining with the initial machining conditions as an initial value of the machining conditions.

12 Claims, 12 Drawing Sheets

FIG. 10

| | TOOLS NOW USE (D01) | TOOLS OF THE SAME LOT AS THAT OF TOOL NOW USED (D02) | ALL OF TOOLS OF THE SAME KIND AS THAT OF TOOL NOW USED (D03) |
|---|---|---|---|
| WORKPIECES NOW USED (D10) | D11 | D12 | D13 |
| WORKPIECES OF THE SAME LOT AS THAT OF WORKPIECE NOW USED (D20) | D21 | D22 | D23 |
| ALL OF WORKPIECES OF THE SAME KIND AS THAT OF WORK PIECE NOW USED (D30) | D31 | D32 | D33 |

101

MACHINING CONTROL SYSTEM

CROSS REFERENCE TO RELATED APPLICATION

This application is based on Application No. 2000-065279, filed in Japan on Mar. 9, 2000, the contents of which are hereby incorporated by reference.

BACKGROUND OF THE INVENTION

This invention relates to a machining control system for controlling machining state(s) of machine tools and, more particularly, to a machining control system made up of numerical controllers (NCs) which has functions of automatically determining machining conditions or automatic programming systems, or machining control systems made up of the combination of programming devices such as CAMs with numerical controllers.

In machining, it is not easy to determine the machining conditions such that the efficiency is high, the precision is high and no abnormality occurs because a large number of factors such as tools, workpieces to be machined (hereinafter referred to as workpieces), machines and coolants are complicatedly related to each other. For that reason, up to now, the machining conditions have been automatically determined by the following main two approaches.

One of those approaches is directed to a machining condition determining system disclosed in Japanese Patent Publication No. 7-41516 (refer to FIG. 13), Japanese Patent Laid-Open No. 2-218538, Japanese Patent Laid-Open No. 10-86039, Japanese Patent Laid-Open No. 3-43132, and the like. This system mathematically represents and retains the knowledge of skilled men for determining the machining condition in accordance with various factors such as the tool and the workpiece which influence the machining so as to automatically determine the machining conditions. Further, it is general to provide a mechanism for additionally learning the knowledge for determining the machining condition. In this approach, the knowledge is normally acquired by the learning in an off-line manner, and this approach is mainly applied to CAD/CAM, an automatically programming system, or the like. In the following description, the approach of this type is called "first approach".

Another approach is directed to an adaptive control system disclosed in Japanese Patent Laid-Open No. 62-292347 (refer to FIG. 14), Japanese Patent Laid-Open No. 2-218538, Japanese Patent Laid-Open No. 6-8106, and the like. In this system, the machining states are monitored on the basis of signals obtained by sensors or the like and the machining conditions are changed in such a manner that an objective function is optimized while keeping given constraints, to thereby control the machining in an appropriate state. This approach changes the machining conditions at a real time in accordance with the actual machining states, and is mainly applied to the numerical controller or the like. In the following description, the approach of this type is called "second approach".

Those conventional systems will be complementarily described in more detail. FIG. 13 is a block diagram showing the structure of conventional system using the first approach (disclosed in Japanese Patent Publication No. 7-41516) among the above conventional approaches. In the figure, reference numerals 5 and 11 denote a spindle motor and a grinding motor which are to be controlled, respectively. Reference numeral 14 denotes a first RAM in which data related to the shape and material of the spindle (workpiece), etc., and data related to the tool and the machining method are stored. Reference numeral 15 denotes a second RAM for storing standard machining data which are set therein, 16 is an automatic machining condition setting circuit for automatically setting the machining condition on the basis of the data stored in the first and second RAMs, 18 is a CRT for displaying the machining condition which is automatically set, and 12 is a keyboard used in the case where an operator judges that the machining condition displayed on the CRT 18 is improper and corrects the machining condition. Further, in the figure, a portion "a" surrounded by a phantom line is means for storing a corrected rate as the coefficient every time when the operator corrects the machining condition and automatically correcting the machining condition by using the data in the next machining.

The operation of the conventional system shown in FIG. 13 will be described in brief. In the automatic machining condition setting circuit 16, the machining condition is automatically determined on the basis of the data retained in the first and second RAMs, and if a correction is necessary, the operator conducts the correction. In addition, when the correction has been conducted, the rate of the correction is retained as the coefficient, and the coefficient is used to conduct the automatic correction in the next machining.

Further, FIG. 14 is a block diagram showing the structure of a conventional system using the second approach (disclosed in Japanese Patent Laid-Open No. 62-292347) among the above conventional approaches. In the figure, reference numeral 40 denotes machining load detecting means for detecting a machining load, 41 is standard machining load deriving means for sampling an output of the machining load detecting means 40 at the time of a model machining using a reference tool to derive the standard machining load on the basis of the sampled output, and 42 is machining condition setting means for setting the machining condition at the time of actual machining using a tool similar to the reference tool. Reference numeral 43 denotes target load calculating means for calculating a target load on the basis of the standard machining load derived by the standard machining load deriving means 41 and the machining condition at the time of actual machining which is set by the machining condition setting means 42, and 44 is feed rate control means for increasing or decreasing a feed rate such that the machining load detected by the machining load detecting means 40 at the time of actual machining becomes the target load calculated by the target load calculating means 43.

The operation of the conventional system shown in FIG. 14 will be described below. The model machining is conducted on only the reference tool, and the machining load at the time of the model machining is detected by the machining load detecting means 40, and the standard machining load deriving means 41 derives the standard machining load on the basis of the machining load thus detected. In the actual machining time, the target load calculating means 43 is actuated and calculates the target load on the basis of the machining condition at the time of actual machining which is set by the machining condition setting means 42 and the reference machining load derived at the time of model machining. The feed rate control means 44 compares the target load thus calculated with the actual machining load detected by the machining load detecting means 40 to change the feed rate such that the detected actual load approaches the calculated target load.

The conventional first approach is made provided that rules or models which determines the machining condition on the basis of the factors that basically influence the machining is identical with the actual machining environment and a fluctuation of the actual machining environment is sufficiently small. However, the above provision is hardly satisfied for the following reasons.

In general, in machining, there are many indefinite elements because the phenomenon is physically unclear, the phenomenon occurs only stochastically, much labor is required for making models, and the like. For example, in cast material, it has been known that variation of hardness by several tens of % cannot be prevented due to the metal composition, heat flow conditions, and the like at the time of manufacturing a casting. Similarly, in the tool, it has been known that the sharpness of the tool varies by several tens of % depending on the metal composition, coating state, grinding precision, and the like, even if a tool of the same model number is repeatedly used. In workpieces or tools which are manufactured at the same time, that is, of the same lot, the variation is somewhat improved, but slight variation cannot be prevented. There are many elements that are difficult to estimate such as not only the variation of the workpiece and the tool but also chip jamming, chipping, the state of coolant, or the like, which suddenly change during machining.

Therefore, in the conventional first approach, in order to prevent an abnormality from occurring even if the unexpected phenomena occur, a sufficiently safe machining condition must be set, increasing loss, as a result of which the efficiency is lowered.

On the other hand, the conventional second approach may be insufficient from the viewpoint of efficiency and reliability although it can cope with variations of the machining environment to some degree. That is, because a delay of detection and control always exists in adaptive control, there is the possibility that it will take a long time to reach the optimum state or that an abnormality may occur until reaching the optimum state, depending on the initial machining condition. In particular, this leads to problems in high speed machining which has been increasing in recent years. For example, in a drilling process using a drill, there is a case where it does not take 0.1 seconds to drill one hole, which is not sufficiently long as compared with a normal delay (several tens msec.) of control in the adaptive control. That is, there is the possibility that the state does not reach the optimum state. As described above, since a delay occurs in the adaptive control, if the initial machining conditions are improper, there arises a problem from the viewpoint of reliability. Further, there arises such a problem in that it is difficult to estimate the tact time as a problem inherent to adaptive control. This is a reason why the second approach is not applied to a mass production line.

The above problems are caused by the separation of the determination of the machining conditions at the machining information determination stage from the adjustment of the machining conditions at the adaptive control stage. That is, the problems reside in that the former does not take the actual machining environment and the adaptive control manner into consideration, and the latter only faithfully keeps to the given condition (the machining conditions and the control parameters).

SUMMARY OF THE INVENTION

The present invention has been made in order to solve the above problem, and therefore an object of the present invention is to provide a machining control system which balancedly combines the determination of the machining conditions at a machining information determination stage with the adjustment of the machining conditions at an adaptive control stage, thereby being capable of keeping the optimum machining state and enhancing the efficiency and the reliability even in the case where an actual machining environment fluctuates.

With the above object(s) in view, the machining control system of the present invention comprises a machining data base for storing information necessary for determining initial machining conditions, machining information determining means for obtaining the initial machining conditions on the basis of the information stored in the machining data base and in accordance with adaptive control characteristics defined by adaptive control modes and adaptive control parameters and adaptive control means for controlling the machining in appropriate states by changing the machining conditions in accordance with the machining states observed during the machining with the initial machining condition as initial value of the machining conditions.

The machining data base may store therein information on tool characteristics, workpiece characteristics, relational expression of the machining states to the tool characteristics/the workpiece characteristics and the machining conditions, standard machining conditions and machining state target values.

In the case where there are a plurality of selectable adaptive control characteristics, the machining information determining means may select the adaptive control characteristics such that any one of a machining period of time, a shape error, an abnormality occurrence rate and a tool wear amount becomes minimum among the plurality of adaptive control characteristics, and determines the initial machining conditions suitable for the adaptive control characteristics selected.

The adaptive control means may analyze at least one of the tool characteristics and the workpiece characteristics on the basis of the machining states that are observed through the machining and the machining condition, and updates at least one of the informations of the tool characteristics and the workpiece characteristics which are retained in the machining data base.

The machining data base may be structured by characteristics inherent to the tools and the workpieces now used, characteristics common to the tools and the workpieces of the same lots as those of the tools and the workpieces now used, and characteristics common to all of the tools and the workpieces of the same kinds of the tool and the workpiece now used.

In the case where the machining is conducted first after the tool has been exchanged, the machining information determining means may obtain the machining conditions such that the expected machining states do not exceed machining state target values taking the characteristics common to the tools of the same lot or the same kind and variations in the characteristics of the tools into consideration which are stored in the machining data base, and the machining conditions are determined as the initial machining condition.

In the case where the machining is conducted first after the workpiece has been exchanged, the machining information determining means may obtain the machining conditions such that the expected machining states do not exceed machining state target values taking the characteristics common to the workpieces of the same lot or the same kind and a variation in the characteristics of the workpieces into consideration which are stored in the machining data base, and the machining conditions are determined as the initial machining condition.

The adaptive control means may judge that the abnormality occurs if the tool characteristics and the workpiece characteristics which are referred to in determination of the machining conditions in the machining information determining means are largely different from the tool characteristics and the workpiece characteristics which are analyzed in the adaptive control means, respectively, and updates at least one of the information of the tool characteristics and the workpiece characteristics with respect to the machining data base, and the machining information determining means re-determines the adaptive control characteristics and the machining conditions to prevent the abnormality.

BRIEF DESCRIPTION OF THE DRAWINGS

The present invention will become more readily apparent from the following detailed description of the preferred embodiments of the present invention taken in conjunction with the accompanying drawings, in which:

FIG. 10 is a diagram showing an example of the data base structured in a machining control system in accordance with a fourth embodiment of the present invention;

DETAILED DESCRIPTION OF THE PREFERRED EMBODIMENTS

FIRST EMBODIMENT

Figure 1:
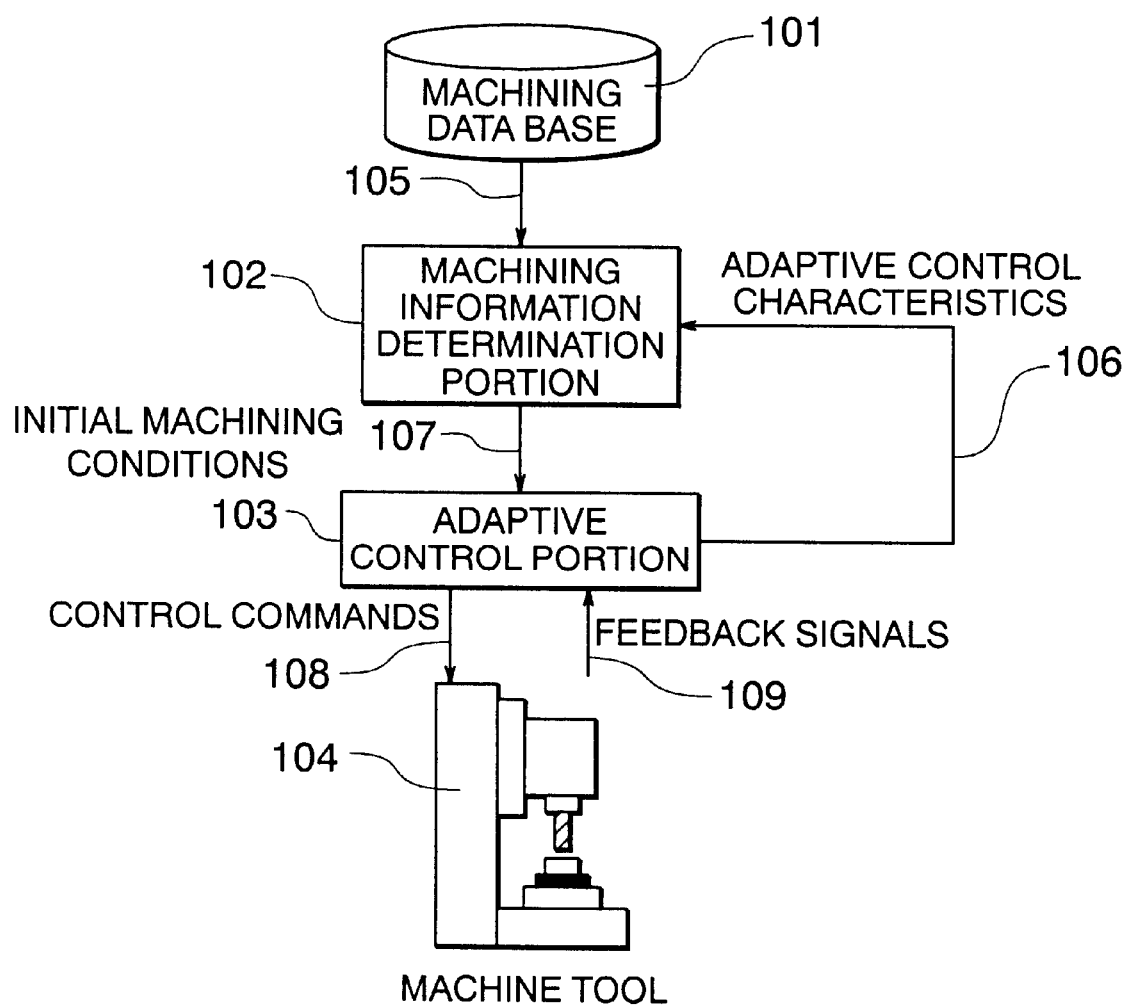
FIG. 1 is a block diagram showing the structure of a machining control system in accordance with a first embodiment of the present invention.

FIG. 1 is a block diagram showing the structure of a machining control system in accordance with a first embodiment of the present invention. In the figure, reference numeral 101 denotes a machining data base in which various information required to determine the machining conditions is stored, 102 is a machining information determination portion (machining information determining means) for determining an initial machining condition on the basis of the information stored in the machining data base 101 and adaptive control characteristics set in an adaptive control portion 103, 103 is the adaptive control portion (adaptive control means) for controlling the machining in an appropriate state by setting the initial machining conditions determined by the machining information determination portion 102 to initial values of the machining condition and by changing the machining conditions in accordance with machining states observed during the machining, and 104 is a machine tool to be controlled. Further, reference numeral 105 denotes information on tool characteristics, workpiece characteristics, relational expressions of the machining states with respect to the tool characteristics/the workpiece characteristics and the machining conditions, standard machining conditions and machining state target values, which are stored in the machining data base 101, 106 is adaptive control characteristics outputted from the adaptive control portion 103 to the machining information determination portion 102, 107 is initial machining conditions determined by the machining information determination portion 102, 108 is control commands outputted from the adaptive control portion 103, and 109 is feedback signals outputted from the machine tool 104.

There is stored in the machining data base 101, the information 105 on the tool characteristics, the workpiece characteristics, the relational expressions of the machining states with respect to the tool characteristics/the workpiece characteristics and the machining conditions, the standard machining conditions and the machining state target values. The machining information determination portion 102 determines the initial machining conditions 107 in accordance with the information 105 on the tool characteristics, the workpiece characteristics, the relational expressions of the machining states with respect to the tool characteristics/the workpiece characteristics and the machining conditions, the standard machining conditions and the machining state target values which are acquired from the machining data base 101 and the adaptive control characteristics 106 acquired from the adaptive control portion 103.

In this specification, the machining condition is directed to a feed rate, a spindle rotation speed, a feed pattern (in the drilling process, a drill cycle during which a drill is fed to a hole bottom once, a pecking cycle during which the drill is fed to the hole bottom through several reciprocation, or the like), or parameters for adaptive control (the machining state target values or the like).

The adaptive control portion 103 uses the initial machining conditions 107 as the machining conditions initially (or in the initial state), and thereafter (during the machining), recognizes the machining states on the basis of control commands 108 which are transmitted to the machine tool 104, feedback signals 109 such as loads which are obtained from the machine tool 104 or signals from other sensors (not shown), or the like, and transmits the control commands 108 for retaining the machining in an appropriate states to the machine tool 104 by changing the machining conditions in accordance with the machining states. The recognition of the machining states is made by using the known technique disclosed in, for example, Japanese Patent Laid-Open No. 9-6432.

Figure 2:
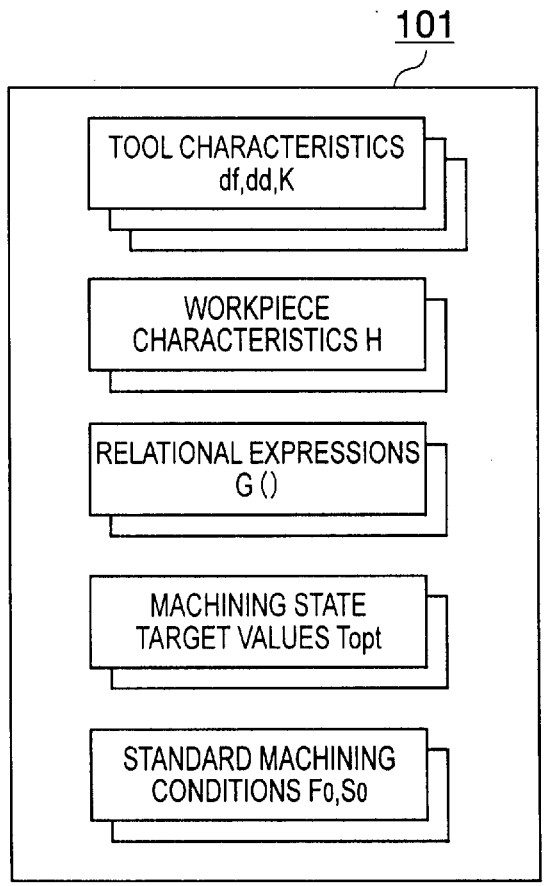
FIG. 2 is a diagram showing an example of a machining data base in the machining control system in accordance with the first embodiment of the present invention.

FIG. 2 shows an example of the machining data base 101. In the machining data base 101 are stored machining characteristics (df, dd, K), workpiece characteristics (H), the relational expressions (G( )) of the machining states with respect to the tool characteristics/the workpiece characteristics and the machining conditions, machining state target values (Topt) and standard machining conditions (Fo, So). The tool characteristics are stored for each of the tools, the workpiece characteristics are stored for each of the workpieces, and other information is stored for each of the combinations of the tool with the workpiece. The relational expression G is represented as follows, for example, in case of the torque in the tool rotating direction during the drilling process.

$$G(H,K,f,df,D,dd)=H \cdot K(f \hat{} df + D \hat{} dd) \tag{1}$$

where f is a feed per revolution, D is a diameter of the drill, and H is a hardness of the workpiece. Further, mark (^) is adaptive such that x ^y represents $x^y$. K, df and dd simply denote coefficients, respectively, and specifically, K is a coefficient indicative of the cutting property of the tool, df is a coefficient indicative of the relation between the feed f and the load, and dd is a coefficient indicative of the relation between the tool diameter d and the load.

Figure 3:
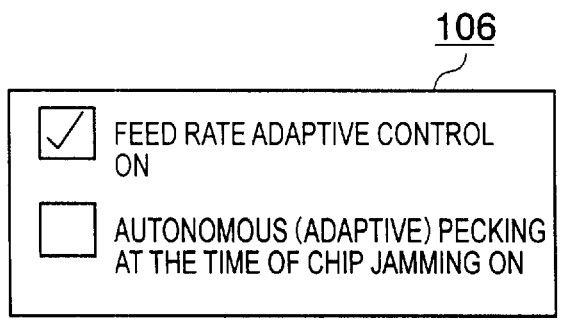
FIG. 3 is a diagram showing an example of the adaptive control characteristics in the machining control system in accordance with the first embodiment of the present invention.

FIG. 3 shows an example of the adaptive control characteristics 106. In the figure, as the adaptive control characteristic, "feed rate adaptive control" is valid (on), and "autonomous (adaptive) pecking at the time of chip jamming" is invalid (off). The adaptive control characteristics 106 indicate whether the adaptive control are conducted, or how the processing are additionally conducted, or not. The adaptive control characteristics 106 are defined by adaptive control modes and adaptive control parameters. The adaptive control characteristics 106 are inputted to the adaptive control portion 103 by an operator in advance before the machining control system is activated.

Figure 4:
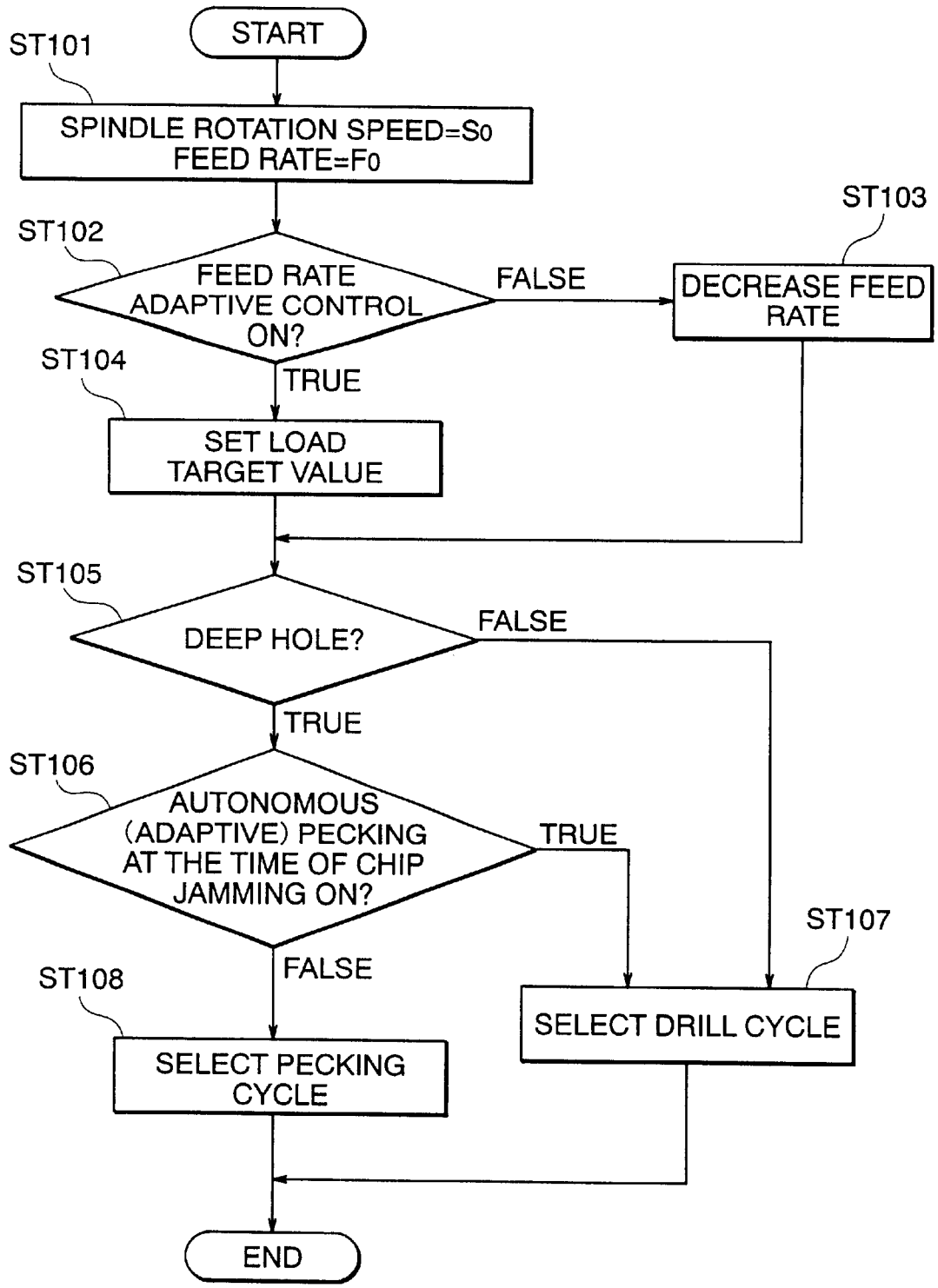
FIG. 4 is a flowchart showing the determining operation of initial machining conditions by a machining information determination portion in the machining control system in accordance with the first embodiment of the present invention.

Subsequently, the operation will be described. FIG. 4 is a flowchart showing an example of a method of determining the initial machining conditions 107 (in this example, the feed rate, the load target value as the machining state target value and the feed pattern) in the machining information determination portion 102 in case of the drilling process. In this example, the load is used as the machining state. First, in a step ST101, a standard feed rate Fo and a spindle rotation speed So are set as the feed rate and spindle rotation speed respectively. Both of $F_0$ and $S_0$ are acquired from the machining data base 101. Alternatively, the feed rate $F_0$ may be obtained by using the load target value Topt acquired from the machining data base 101 as the following expressions (2) and (3).

$$F_0 = f \times S_0 \tag{2}$$

$$F=(Topt/(H \cdot K) - D \hat{} dd) \hat{} (1/df) \tag{3}$$

Then, in a step ST102, it is checked whether the feed rate adaptive control is on, or not, which is the adaptive control characteristic 106, and if it is true (on), the load is maintained to the load target value by adjusting the feed rate by the adaptive control portion 103 even in the situation where the load may be unexpectedly large. Therefore, the feed rate determined in the step ST101 is adopted as it is as the initial machining condition related to the feed rate, and further in a step ST104, the load target value Topt to be maintained is acquired from the machining data base 101 and set. On the other hand, if the feed rate adaptive control is false (off) in the step ST102, because there is a risk that the load becomes unexpectedly large, the adaptive control portion 103 decreases the feed rate to be lower than the feed rate determined in the step ST101, taking a given safety factor into consideration, and sets the feed rate thus decreased as the initial machining condition related to the feed rate.

Then, it is checked in a step ST105 whether it is a deep hole, or not. The check of whether it is a deep hole or not is conducted by checking whether the ratio of the depth of the hole to be machined to the diameter thereof exceeds a given value (for example, about 3), or not. In case of the deep hole, the control is advanced to a step ST106, whereas in case of no deep hole, the control is advanced to a step ST107, where a drill cycle is selected as the initial machining condition related to the feed pattern. In the step ST106, it is checked whether the autonomous (adaptive) pecking at the time of the chip jamming is on, or not, which is the adaptive control characteristic 106, and if the autonomous (adaptive) pecking is true (on), the control is advanced to the step ST107, where since the pecking operation is automatically conducted at a necessary portion in the adaptive control portion 103, the drill cycle is selected as the initial machining condition related to the feed pattern. On the other hand, if the autonomous (adaptive) pecking is false (off) in the step ST106, the control is advanced to a step ST108 where since there is the possibility that the chip jamming occurs, the pecking cycle is selected as the initial machining condition related to the feed pattern.

As described above, according to the present invention, the machining information determination portion 102 determines the appropriate initial machining condition (the feed rate and the feed pattern) in accordance with the information stored in the machining data base and the adaptive control characteristic 106, and the adaptive control portion 103 starts the machining with the determined initial machining condition as the initial value of the machining condition, and changes the machining condition in accordance with the machining state observed during the machining. Thus, the machining can be controlled to the appropriate state. As a result, because the initial machining condition can be determined to the conceivably optimum condition, the loss is low and the efficiency is improved. Further, because the initial machining condition is optimum, the normal control delay time of the adaptive control can be remarkably reduced as compared with a case in which an improper (different) initial machining condition is selected, thereby being capable of improving the reliability.

In the above description, the relational expression (G( )) of the machining state with respect to the tool characteristics/the workpiece characteristics and the machining conditions, and the machining state target values (Topt) are stored for each of the combinations of the tools with the workpieces. However, for example, they may be simplified for each of the tools if the influence of the workpieces is small. On the contrary, if the influence of the tools is small, they may be simplified for each of the workpieces. In those cases, a memory size necessary within the machining data base 101 is small, and the calculation is also simplified.

In the above description, the adaptive control characteristic 106 is acquired from adaptive control portion 103. Alternatively, the adaptive control characteristics 106 may be acquired from the adaptive control portion 103 before the machining information is determined by the machining information determination portion 102 and retained in a memory (not shown) within the machining information determination portion 102, and the information within the memory may be referred to at the time of determining the machining information. In this case, since a period of time (for example, a communication period of time) necessary to acquire the adaptive control characteristics 106 from the adaptive control portion 103 is deleted, a higher machining information determination is enabled.

In addition, if the response of the adaptive control (for example, 50 ms), the sensitivity of the adaptive control (for example, the load of 10 N or more can be observed), and the like, are stored in the adaptive control portion 103 as the adaptive control characteristics 106, and the machining information determination portion 102 refers to the above information and strictly determines the machining conditions, the efficiency and the reliability are further improved.

SECOND EMBODIMENT

Figure 5:
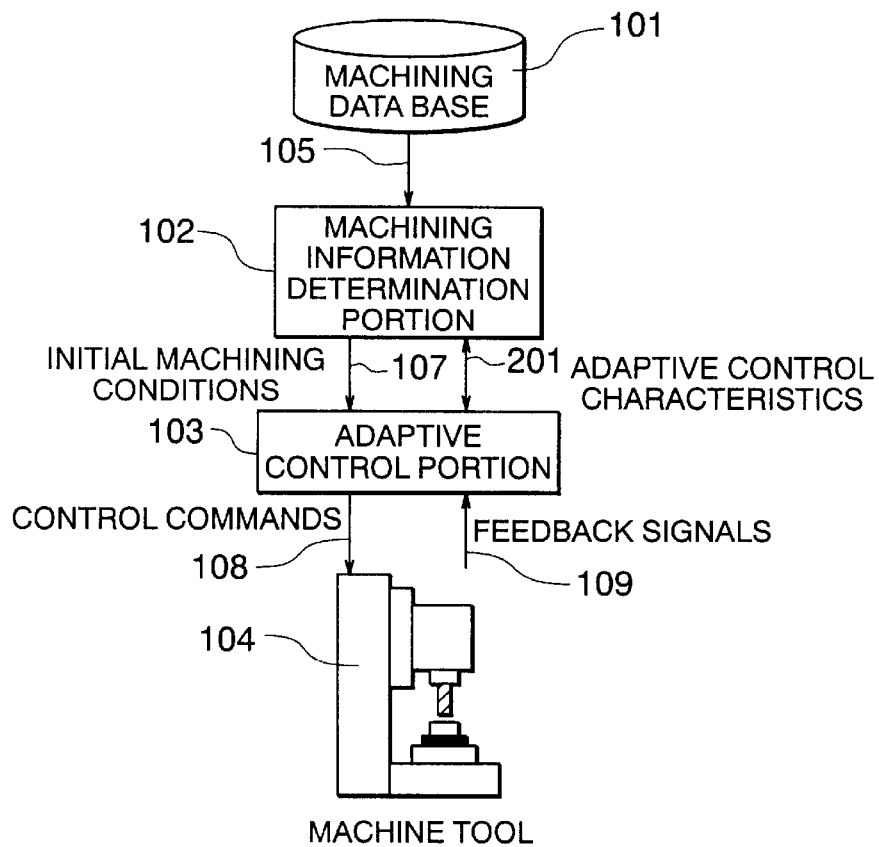
FIG. 5 is a block diagram showing the structure of a machining control system in accordance with a second embodiment of the present invention.

FIG. 5 is a block diagram showing the structure of a machining control system in accordance with a second embodiment of the present invention. In the figure, reference numeral 201 denotes an adaptive control characteristics. Since other structural elements are identical with those shown in FIG. 1, they are designated by the like references, and their description will be omitted. The machining information determination portion 102 determines the adaptive control characteristics in a method which will be described later and gives commands to the adaptive control portion 103 if there are a plurality of selectable adaptive control characteristics.

Figure 6:
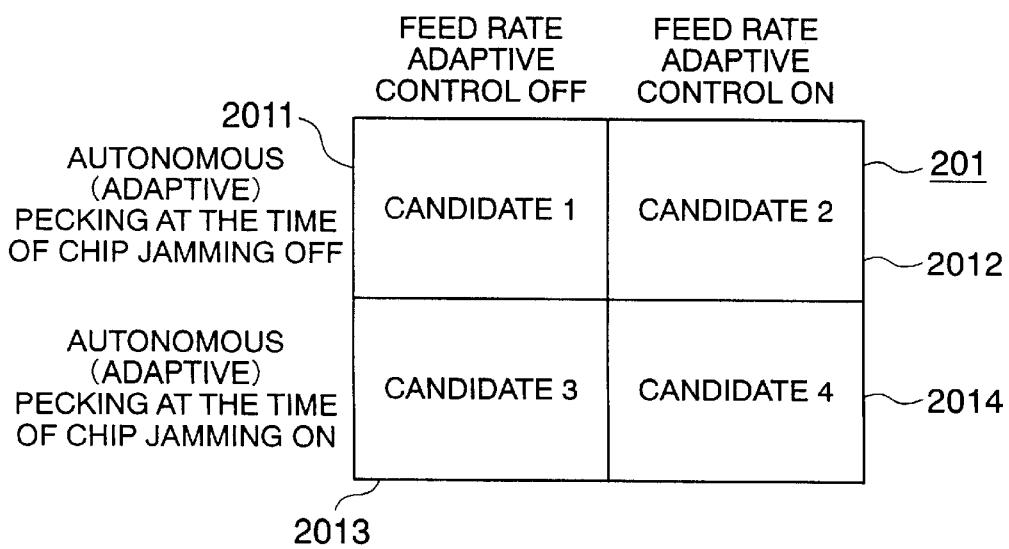
FIG. 6 is a diagram showing an example in which there are a plurality of selectable adaptive control characteristics in the machining control system in accordance with the second embodiment of the present invention.

FIG. 6 shows an example in which there are a plurality of selectable adaptive control characteristics 201. In the example shown in the figure, there are selectable four candidates 1 to 4 in total (reference numerals 2011 to 2014) including the combination of cases where the feed rate adaptive control is off and on, and cases where the autonomous (adaptive) pecking is off and on.

Figure 7:
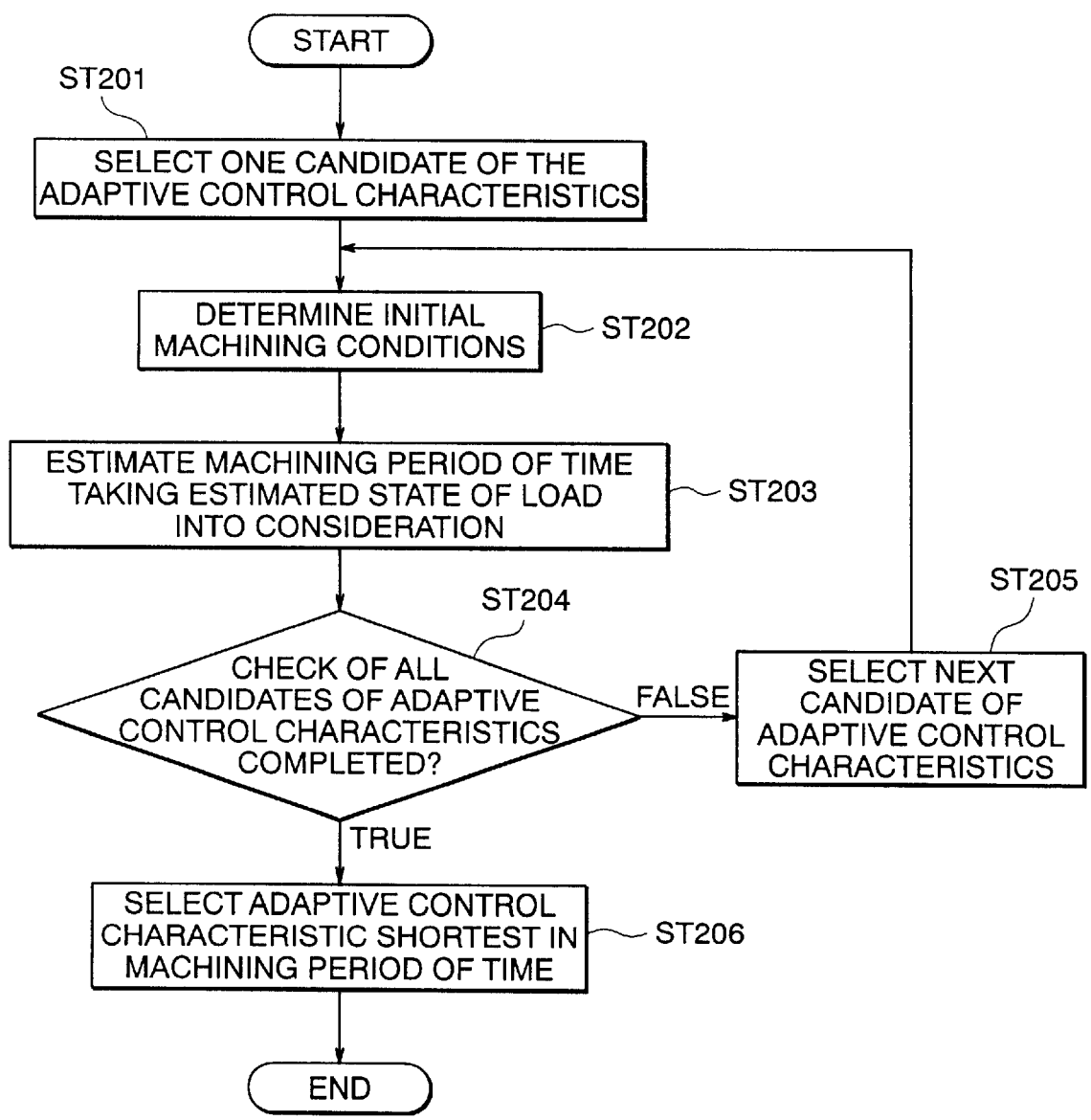
FIG. 7 is a flowchart showing the operation of selecting the optimum candidate from the plurality of selectable adaptive control characteristics by a machining information determination portion in the machining control system in accordance with the second embodiment of the present invention.

FIG. 7 is a flowchart showing a method in which the machining information determination portion 102 selects the optimum candidate among the selectable plural candidates from the viewpoint of the machining period of time. First, in a step ST201, one candidate of the adaptive control characteristics is selected (for example, candidate 1). Then, in a step ST202, the initial machining conditions are determined by, for example, a method described in the above first embodiment. Then, in a step ST203, a machining period of time is estimated taking the estimated state of load into consideration. This method will be described in more detail later. In addition, in a step ST204, it is recognized whether the check of all candidates of the adaptive control characteristics is completed, or not, and if completed, the control is advanced to a step ST206, whereas if not completed, the control is advanced to a step ST205. After the next candidate of adaptive control characteristics has been selected, the control is returned to the step ST202. In the step ST206, the adaptive control characteristics shortest in the machining period of time are selected.

Now, the process in the step ST203 will be described in more detail. In this step, the adaptive control behaviour is estimated through simulation, and the required machining period of time is estimated. For that reason, first, a load $T_0$ occurring at a time to is estimated from the initial machining condition, the relational expression (G( )) of the machining states with respect to the tool characteristics/the workpiece characteristics and the machining conditions, and the machining state target values (Topt). On the contrary, if the adaptive control is on, the adaptive control behavior is simulated, and machining conditions at a next time $t_1$ and a load $T_1$ corresponding to the machining conditions are estimated. This operation is repeated until all of the machining processes are completed. Assuming that a time at which all of the machining processes are completed $t_k$, the machining period of time presumed through the simulation is given as $t_k-t_0$.

In the estimate of the load, if the phenomenon that the load becomes higher (occurrence of the chip jamming) as the hole becomes deeper can be modeled in advance, the model is stored as the tool characteristics or the workpiece characteristics in the machining data base, and the simulation is conducted with reference to the stored characteristics, thereby being capable of expecting a more accurate judgement.

Figure 8:
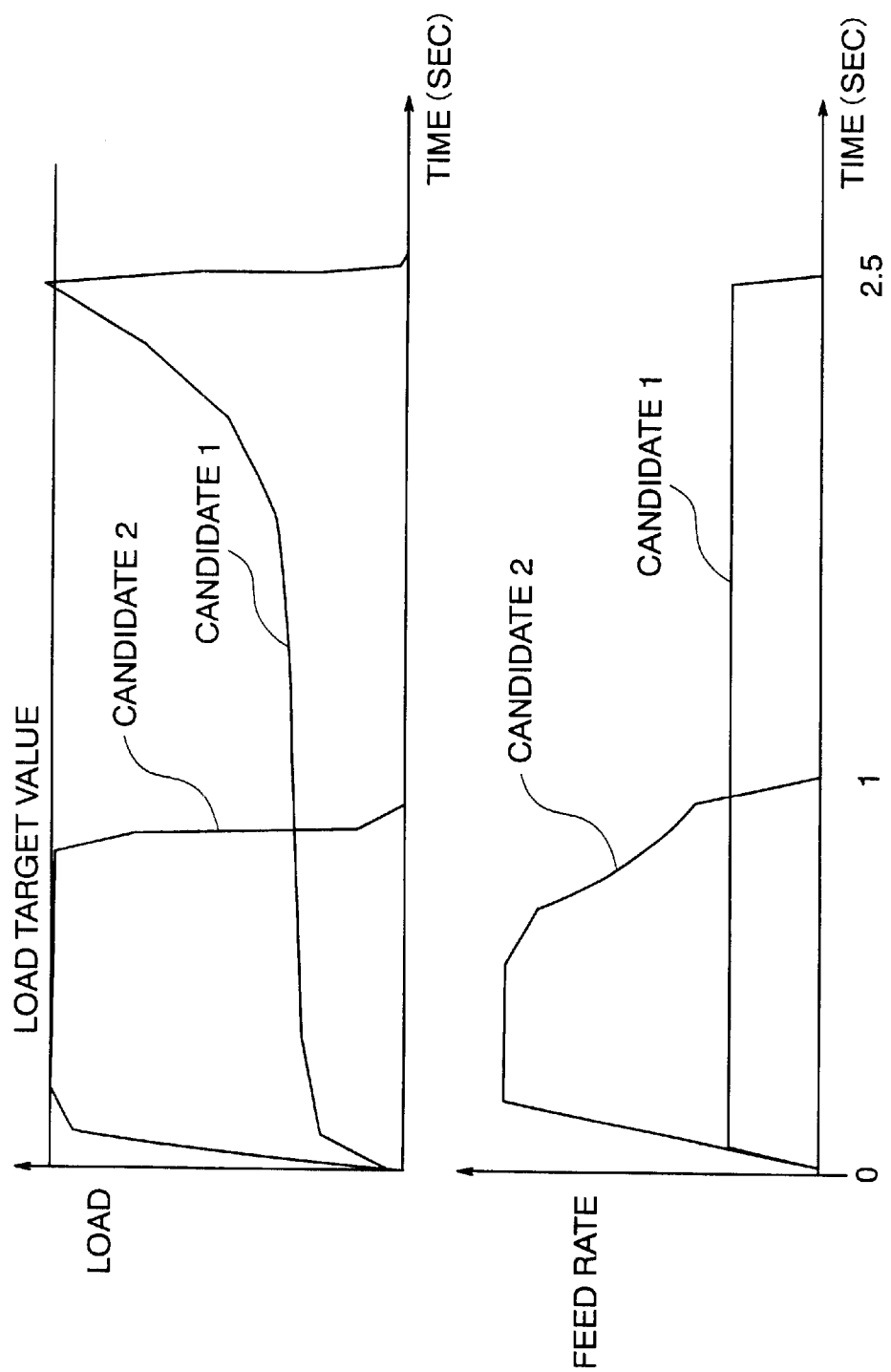
FIG. 8 is a graph showing the result of a process that estimates a machining period of time taking the estimated state of load into consideration in order to select the optimum candidate by the machining information determination portion in the machining control system in accordance with the second embodiment of the present invention.

FIG. 8 shows an example of the process result in the step ST203. In the figure, a lower figure shows a feed rate whereas an upper figure shows a load at that time. In the figure, in case of the candidate 1, since all of the adaptive controls are off, a lower initial feed rate such that the load does not exceed the load target value is selected, and the machining is conducted at a constant speed as it is. The load at that time increases with the chip jamming as a time elapsed (as the tool approaches the hole bottom). In this case, it takes a machining period of time of 2.5 seconds. On the other hand, in case of the candidate 2, since the adaptive control of the feed rate is on, a higher initial feed rate is given in advance, and the feed rate decreases as the tool approaches the hole bottom, to thereby prevent the load from increasing. In this case, it takes the machining period of time of 1 second. Therefore, in this case, the candidate 2 is selected between the candidates 1 and 2. The same process is applied to other candidates 3 and 4.

As described above, according to this embodiment, in the case where there are a plurality of selectable adaptive control characteristics, the machining information determination portion 102 selects the adaptive control characteristics such that any one of the machining period of time, a shape error, an abnormality occurrence rate and a tool wear amount becomes minimum among the plurality of adaptive control characteristics and determines the initial machining conditions suitable for the determined adaptive control characteristics. Therefore, when both of the optimum adaptive control characteristics and the initial machining conditions are determined, the efficiency and the reliability can be further improved.

In the above description, the optimum candidate is selected from the viewpoint of the machining period of time. Alternatively, in the step ST203, the shape error, the abnormality occurrence rate and the tool wear amount may be estimated, and in the step ST206, the candidate smallest in those values is selected, thereby being capable of minimizing any one of the shape error, the abnormality occurrence rate and the tool wear amount.

For example, the same procedure as that of minimizing the machining period of time is applied to a case of minimizing the shape error. The portion different from the procedure of reducing the machining period of time will be described below. In the step ST203 of FIG. 7, taking the estimated state of load into consideration, the adaptive control behavior is simulated, and at the same time, the shape error is estimated. In this example, the relational expression $\epsilon$ (T) of the load T and the shape error $\epsilon$ is given in advance, and the shape error is estimated by using that function. It is assumed that the functional expression $\epsilon$ (T) is, for example, $$\epsilon(T)=T/Kr \qquad (4)$$

where Kr is the rigidity of the tool, and the deflection of the tool depending on the load is taken into consideration. The argument of the relational expression $\epsilon$ may be the machining conditions or the both of the load and the machining conditions. Further, in the above example, the deflection of the tool is taken into consideration. Besides this, the shape error in the arcuate shape due to a delay of the servo system or an acceleration/deceleration filter, the cusp height determined by the feed per teeth and the tool radius, and the like, can be taken into consideration. In addition, in the step ST206 of FIG. 7, the adaptive control characteristics that the shape error becomes smallest is selected.

Similarly, a case of minimizing the abnormality occurrence rate will be described. The substantially same procedure as that of minimizing the machining period of time is applied to the case of minimizing the abnormality occurrence rate. Hereinafter, a portion different from the procedure of reducing the machining period of time will be described. In the step ST203 of FIG. 7, taking the estimated state of load into consideration, the adaptive control behavior is simulated, and the abnormality occurrence rate is estimated. The abnormality occurrence rate p (T) is difficult to model mathematically, and may be given by some experiential expression. In addition, in the step ST206 of FIG. 7, the adaptive control characteristics smallest in the abnormality occurrence rate is selected.

Similarly, a case of minimizing the tool wear amount will be described. The substantially same procedure as that of minimizing the machining period of time is applied to the case of minimizing the tool wear amount. Hereinafter, a portion different from the procedure of reducing the machining period of time will be described. In the step ST203 of FIG. 7, taking the estimated state of load into consideration, the adaptive control behavior is simulated, and the tool wear amount is estimated. For example, it is assumed that the tool wear amount W is determined by the following expression.

$$W=\int w(T,V)dt \qquad (5)$$

where w (T,V) is the tool wear amount per a unit time, which is the experiential expression determined by the load T and the cutting speed V. The tool wear amount W can be obtained by integrating w by a time. In addition, in the step ST206 of FIG. 7, the adaptive control characteristics smallest in the tool wear amount is selected.

As described above, any one of the shape error, the abnormality occurrence rate and the tool wear amount can be minimized.

Further, in the above description, the optimum adaptive control characteristics are determined from all of options selectable by the adaptive control portion 103. However, only a part of items (for example, the feed rate adaptive control on/off) may be determined by the machining information determination portion 102, and other items may be fixed, selected by an operator or depend on the initial setting of the adaptive control portion 103.

Furthermore, in the above description, all of the adaptive control characteristics are exhaustively checked, and the optimum candidate is searched. As another method, a rule for obtaining the optimum adaptive control characteristics can be made into a knowledge base on the basis of the machining contents or the data stored in the machining data base so that the optimum solution can be obtained by reasoning. In this case, know-how of the skilled men which are difficult to make numeric values can be included therein. The following are examples of the rule.

In case of machining a deep hole, the autonomous (adaptive) pecking turns on so that the drill cycle is selected.

In case of a small-diameter tool, all of the adaptive controls turn off so that the feed rate is reduced to the half of the normal feed rate.

THIRD EMBODIMENT

Figure 9:
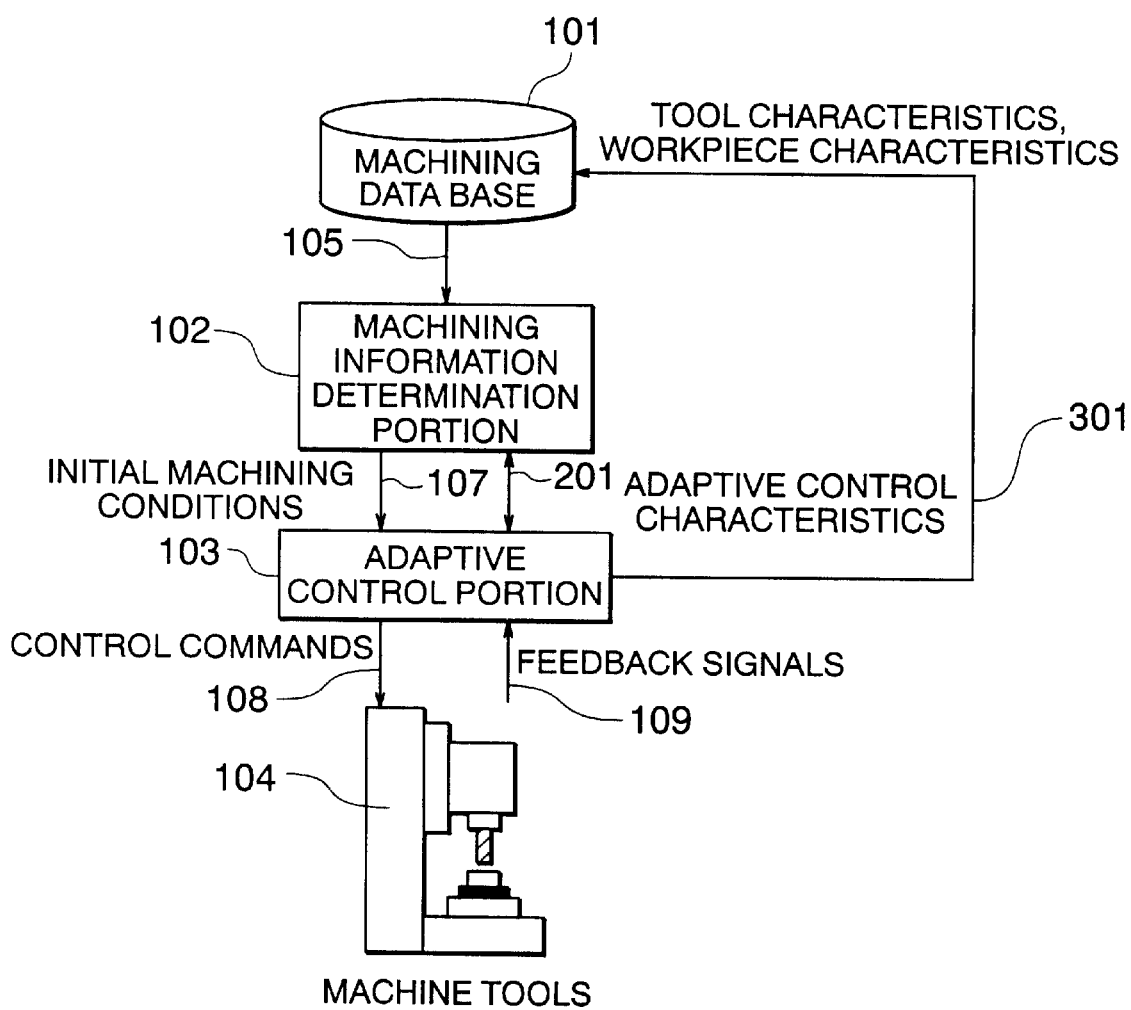
FIG. 9 is a block diagram showing the structure of a machining control system in accordance with a third embodiment of the present invention.

FIG. 9 is a block diagram showing the structure of a machining control system in accordance with a third embodiment of the present invention. In the figure, reference numeral 301 denotes tool characteristics and workpiece characteristics. Since the other structural elements are identical with that shown in FIG. 1 or 5, their description will be omitted.

The adaptive control portion 103 analyzes at least one of the tool characteristics and the workpiece characteristics from the cutting load observed by machining and the machining conditions, and updates at least one of the tool characteristics and the workpiece characteristics with respect to the machining data base 101.

In the method of analyzing the tool characteristics and the workpiece characteristics, assuming that only the hardness H of the workpiece is unknown or uncertain data, and other values are known or reliable in the relational expression given by, for example, the expression (1), H is represented by the following expression (6).

$$H=T/\{K(f\hat{\,}df+D\hat{\,}dd)\} \qquad (6)$$

In general, if H is obtained by a least square method from a plurality of measurement values with the unknown values as parameters, the influence of the measurement error contained in the load T or the like can be reduced.

As described above, according to this embodiment, since the same effects as those obtained in the above first and second embodiments are obtained, and unknown or uncertain data within the machining data base can be learned on the basis of the machining result, the optimum machining is conducted depending on the actual machining environment, and the labor of setting the data within the machining data base can be remarkably reduced.

FOURTH EMBODIMENT

The machining data base 101 and its application were described in the first and second embodiments. In addition, tools are classified into a tool (or a workpiece) now used, a tool (or a workpiece) of the same lot as that of the tool now used and all of tools (or workpieces) of the same kind of that of the tool now used, and the data is retained, thereby being capable of expecting the more reduction of the machining period of time and the higher reliability. In the example, the definitions of the above terms are defined as follows:

Tools which are now used D01:

The real tools now used for machining.

Tools of the same lot as that of the tool now used D02:

Tools manufactured as the same lot as that of the real tool now used for machining.

Of course, the tool is of the same kind (tool model No., model name or the like)

All of tools of the same kind as that of the tool now used D03:

The tool of the same kind as that of the real tool now used for machining.

In general, the tools are manufactured as a different lot.

Workpieces now used D10:

The workpieces which are now used for machining.

Workpieces of the same lot as that of the workpiece now used D20:

Workpieces manufactured as the same lot as that of the real workpiece now used for machining.

Of course, the workpiece is of the same kind (workpiece model No. (S45C) or the like).

All of workpieces of the same kind as that of the workpiece now used D30:

The workpiece of the same kind as that of the real workpiece now used for machining.

In general, the workpiece is manufactured as a different lot.

FIG. 10 shows an example of the data base structured in accordance with the above classification. In the figure, the tools and workpieces are classified into 9 in total in accordance with the respective three classifications of the tools and the workpieces.

In case of utilizing the data base structure, the machining information determination portion 102 directly refers to data D11 pertaining to the tools now used and the workpieces now used. In case of changing the tools, however, data of D11, D21 and D31 becomes invalid and data is copied from D12, D22 and D32, respectively. Further, if the lot of the tool now used changes over, the data of D12, D22 and D32 becomes invalid and data is copied from D13, D23 and D33, respectively. The same is applied to a case where the workpieces are exchanged and a case where the lot of the workpiece changes over.

On the other hand, what updates the result analyzed from the machining result described in the third embodiment is basically D11, and at the same time, all other data may be updated. For example, data of D21 is a tool now used, and the data common to the workpiece of the same lot as that of the workpiece now used. However, for the purpose of storing the analyzed result, the mean value of the data which satisfies that condition may be stored. Accordingly, newly analyzed data is included in D21, and the data that satisfies that condition is subjected to statistics (for example, a mean value is obtained) and retained. It is needless to say that in order to execute the above, all the data corresponding to D21 and the intermediate value which has been subjected to statistics (the number and the total of data corresponding to D21) have to be further retained within the machining data base 101 or the like.

In the above description, the tool sand the workpieces are classified into three, respectively. However, for example, in the case where the workpieces are not changed, a difference in the characteristics between the respective workpieces is small, an influence of the difference in the characteristics between the respective workpieces on the machining is small, or the like, it is unnecessary that the workpieces are classified and only the tools are classified. Likewise, in the case where the tools are not changed, a difference in the characteristics between the respective tools is small, an influence of the difference in the characteristics between the respective tools on the machining is small, or the like, it is unnecessary that the tools are classified and only the workpieces are classified. In these cases, a memory to be used is remarkably deleted.

Further, in the above description, the tools and the workpieces are classified into three, respectively. However, it is needless to say that the tools and the workpieces are classified into only two, respectively, or more subdivided into N (N is a natural number of 4 or more), depending on the management circumstance of the tools or the workpieces at an actual machining location.

As described above, according to this embodiment, the tools are classified into tools (or workpieces) now used, tools (or workpieces) of the same lot as that of the tool now used and all of tools (or workpieces) of the same kind of that of the tool now used, and the data is structured and retained, thereby being capable of reducing the machining period of time and enhancing the reliability. In particular, in a process after the tools have been exchanged or the workpieces have been exchanged which will be described later, the above data structure has an importance that means for reducing the machining period of time and enhancing the reliability is provided.

FIFTH EMBODIMENT

Figure 11:
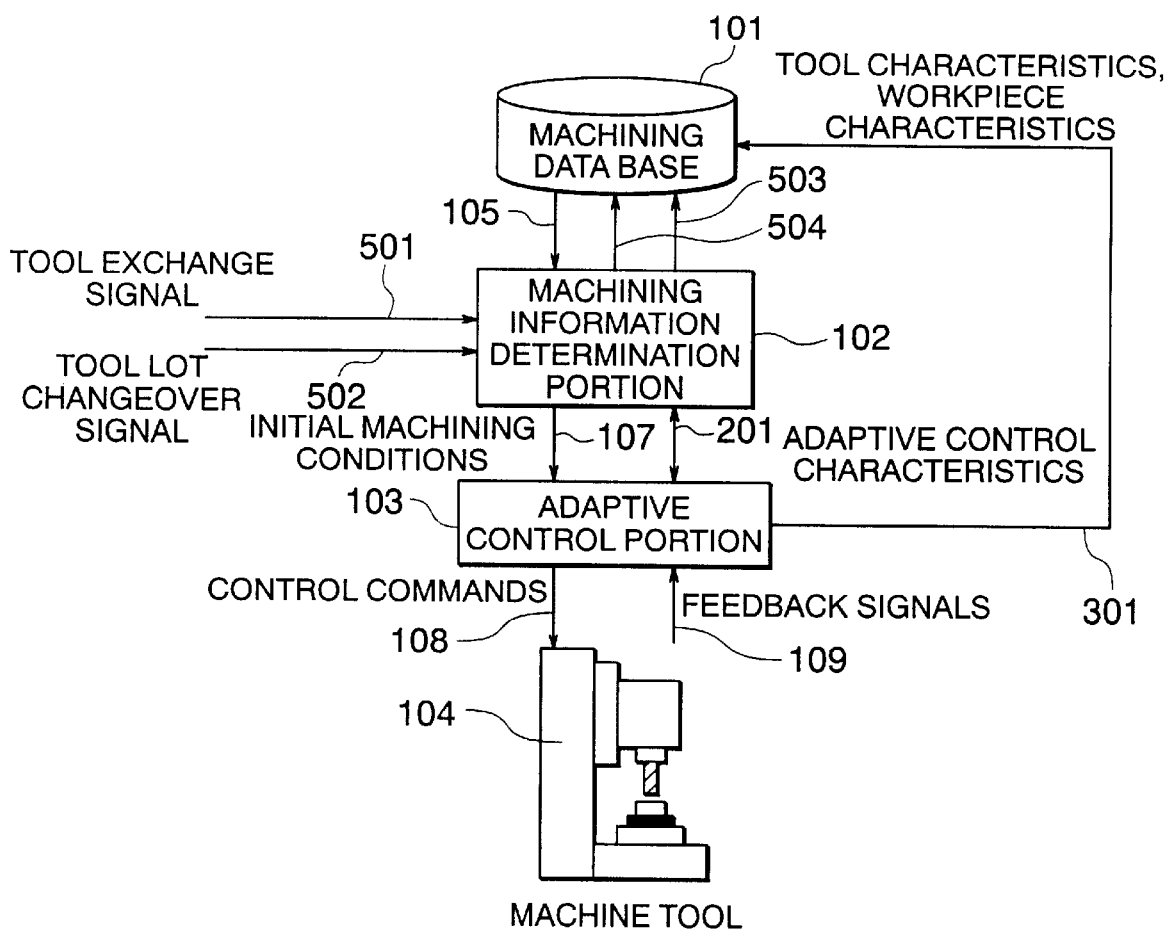
FIG. 11 is a block diagram showing the structure of a machining control system in accordance with a fifth embodiment of the present invention.

FIG. 11 is a block diagram showing the structure of a machining control system in accordance with a fifth embodiment of the present invention. In the figure, reference numeral 501 denotes a tool exchange signal, 502 is a tool lot changeover signal, 503 is a present tool data initializing signal, and 504 is a present lot tool data initializing signal. Since other structural elements are identical with those in FIG. 1, 5 or 9, their description will be omitted.

First, the initializing operation at the time of tool exchange or tool lot changeover will be described.

An operator, a peripheral-device managing unit, a tool exchange device, a tool management device, an external control device (all not shown) or the like gives a tool exchange signal 501 to the machining information determination portion 102 if the tools are exchanged. Upon receiving this signal, the machining information determination portion 102 commands a present tool data initializing signal 503 to the machining data base 101. Upon receiving this signal, the machining data base 101 erases data related to the tools now used (D11, D21 and D31 in FIG. 10), and if the lot is not changed over, the data is copied from data related to the tools of the same lot as that of the tools now used (D12, D22 and D33 in FIG. 10). Conversely, if the lot is also changed over, the data is copied from all of the tools of the same kind as that of the tool now used (D13, D23 and D33 in FIG. 10).

Further, the operator, the peripheral-device managing unit, the tool exchange device, the tool management device, the external control device (all not shown) or the like gives the lot changeover signal 502 to the machining information determination portion 102 if the lot is changed over. Upon receiving this signal, the machining information determination portion 102 commands the present lot tool data initializing signal 504 to the machining data base 101. Upon receiving this signal, the machining data base 101 erases data related to the tools of the same lot that of the tools now used (D12, D22 and D32 in FIG. 10), and instead, the data is copied from all of the tools of the same kind as that of the tool now used (D13, D23 and D33 in FIG. 10).

Subsequently, the initial machining condition determining method immediately after the tools have been exchanged or the tool lot has been changed over will be described. First, in the case where the tool lot is not changed over immediately after the tool has been exchanged, after the above-described initializing operation has been conducted, the machining information determination portion 102 acquires data related to the tools now used and the workpieces now used from the machining data base 101. At this time, since the data (D11 in FIG. 10) is initialized, the data is identical with the data (D12 in the figure) related to the tool of the same lot as that of the tools now used and the workpieces now used. In addition, after or in the determination of the machining condition in accordance with the method described in the first or second embodiment, the machining conditions such that the expected cutting load (the machining state) does not exceed the cutting load target value (the machining state target value) taking the variation of the tool characteristics stored in the machining data base 101 into consideration is obtained. For example, in the above-described expression (3), a feed rate F' is newly obtained in accordance with the following expressions (7) and (8) taking the variation δ(>0) of K among the tool characteristics into consideration.

$$F'=f'\times S_0 \quad (7)$$
$$f'=(Topt/(H\cdot(K+\delta))-D\hat{}dd)\hat{}(1/df) \quad (8)$$

The variation a is set in the machining data base 101 in advance or the machining result is analyzed and set in the machining data base 101.

As described above, according to this embodiment, in the case where the machining is conducted first after the tools have been exchanged, since the machining information determination portion 102 obtains the machining condition such that the expected machining state does not exceed the machining state target value taking the characteristics common to the tools of the same lot or the same kind and a variation in the characteristics of the tools into consideration, and the initial machining conditions are determined with the above machining conditions. Therefore, even if the tools have been exchanged, the data of the tools of the same lot or the same kind which is stored in the machining data base is effectively utilized, thereby being capable of determining the initial machining condition safe and high in the efficiency.

SIXTH EMBODIMENT

In the fifth embodiment, the method of initializing the machining data base after the tools have been exchanged and determining the initial machining conditions in the machining information determination portion 102 is described. It is apparent that the entirely same process can be conducted even after the workpieces have been exchanged. That is, even if the workpieces have been exchanged, the data related to the workpieces now used and the data related to the workpieces of the same lot as that of the workpieces now used are initialized, and the machining conditions such that the expected cutting load (the machining state) does not exceed the cutting load target value (the machining state target value) is obtained taking the variation of the workpiece characteristics into consideration.

As described above, according to this embodiment, in the case where the machining is conducted first after the workpieces have been exchanged, since the machining information determination portion 102 obtains the machining conditions such that the expected machining state does not exceed the machining state target value taking the characteristics common to the workpieces of the same lot or the same kind and a variation in the characteristic of the workpieces into consideration, and the initial machining condition is determined with the above machining conditions. Therefore, even if the workpieces has been exchanged, the data of the workpieces of the same lot or the same kind which is stored in the machining data base is effectively utilized, thereby being capable of determining the initial machining conditions safe and high in the efficiency.

SEVENTH EMBODIMENT

Figure 12:
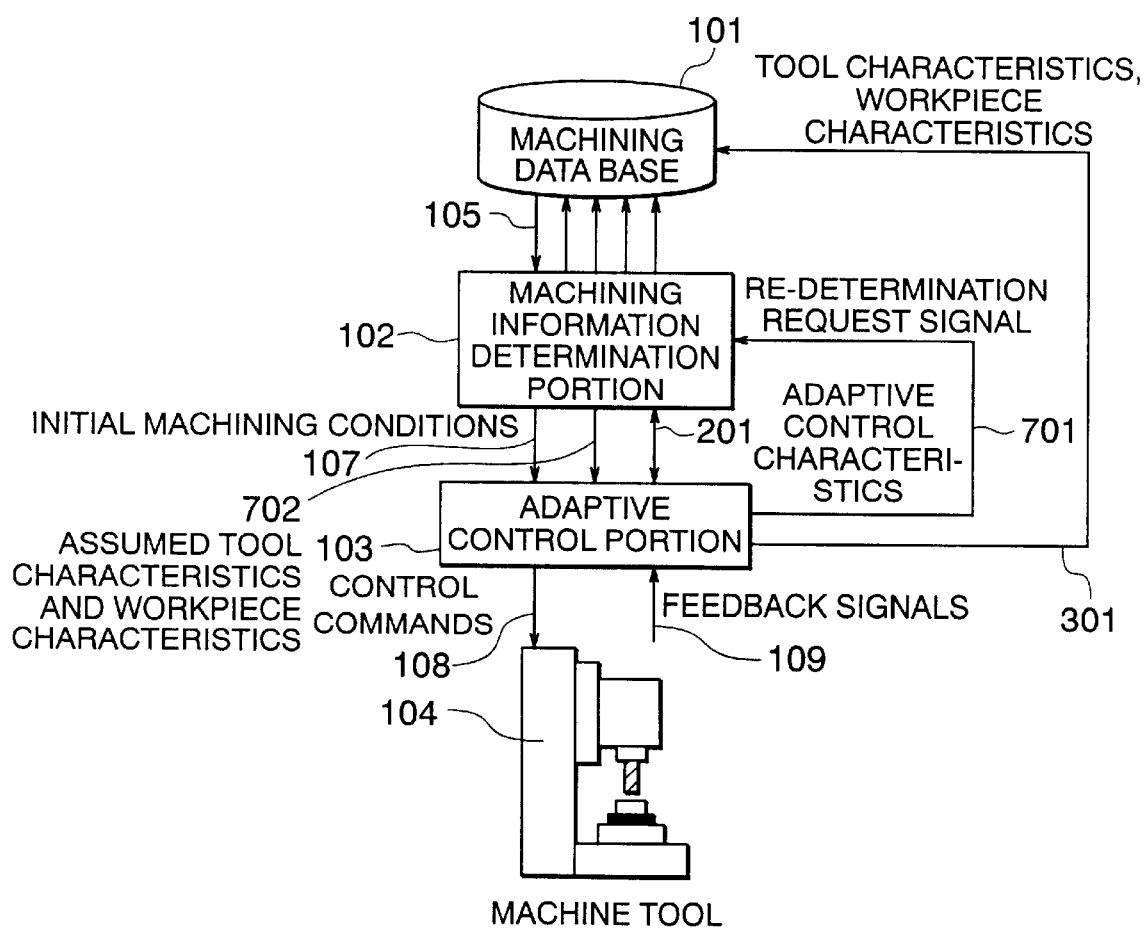
FIG. 12 is a block diagram showing the structure of a machining control system in accordance with a seventh embodiment of the present invention.
Figure 13:
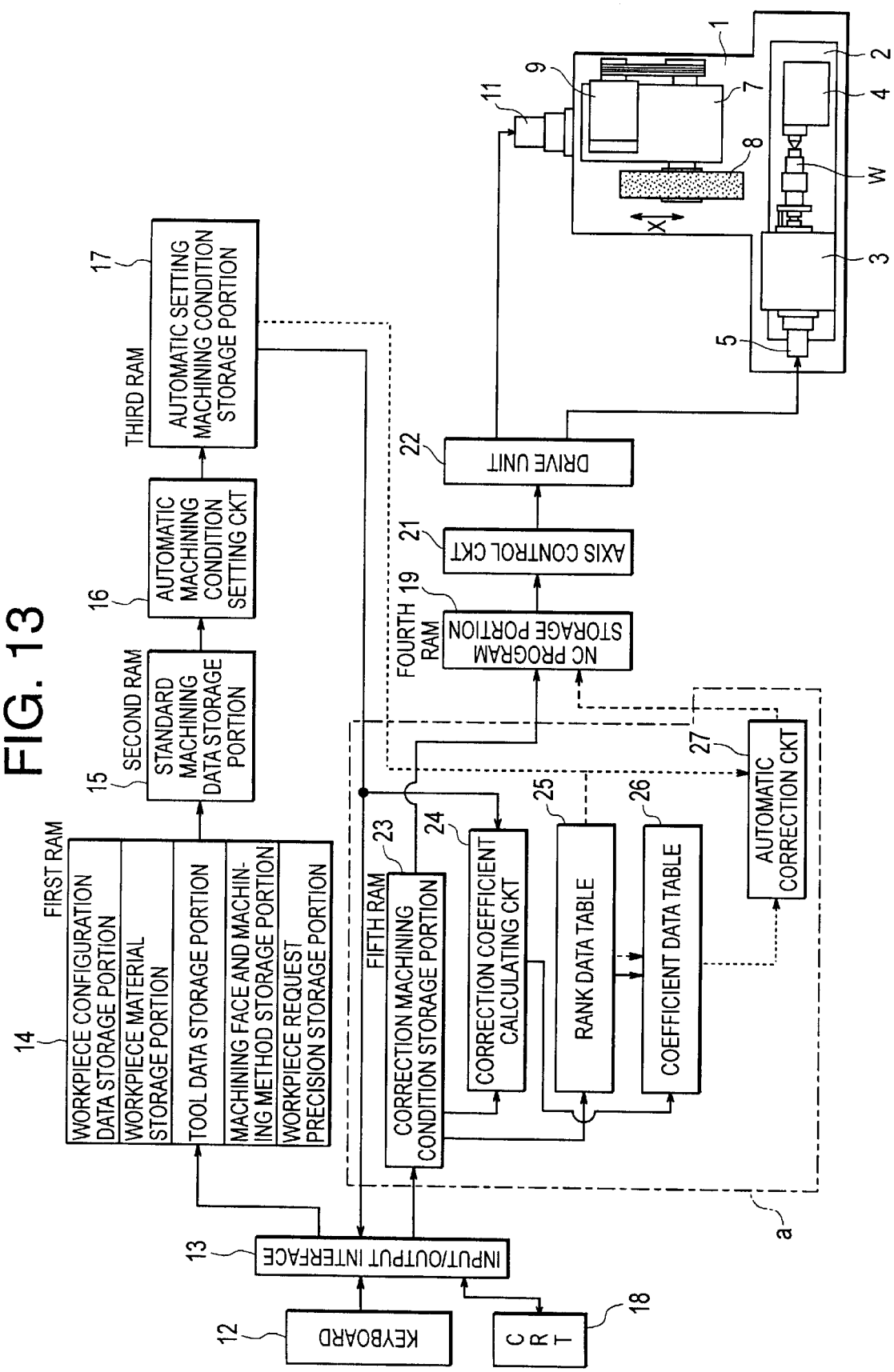
FIG. 13 is a diagram showing the structure of a conventional machining condition determining system.
Figure 14:
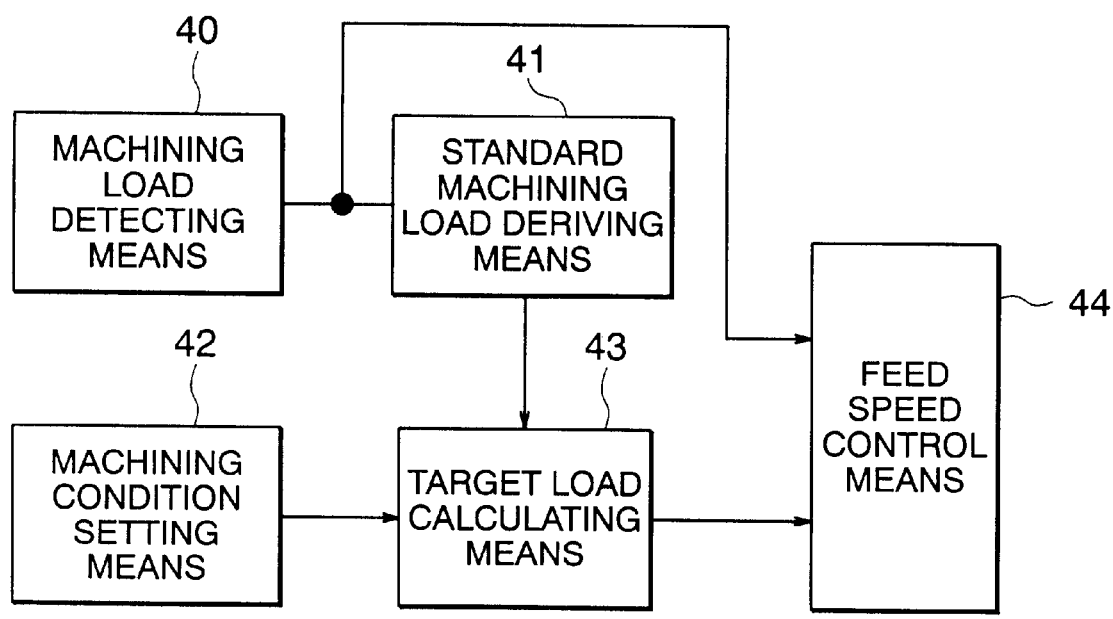
FIG. 14 is a diagram showing the structure of a conventional adaptive control system.

FIG. 12 is a block diagram showing the structure of a machining control system in accordance with a seventh embodiment of the present invention. In the figure, reference numeral 701 denotes a re-determination request signal, and 702 are assumed tool characteristics and assumed workpiece characteristics. Since other structural elements are identical with those in FIG. 1, 5, 9 or 11, their description will be omitted.

In the figure, before the machining, the machining information determination portion 102 transmits the initial machining conditions 107 and transmits the tool characteristics and the workpiece characteristic referred to in determination of the initial machining conditions 107 to the adaptive control portion 103 as the assumed tool characteristics and workpiece characteristics 702.

The adaptive control portion 103 retains the assumed tool characteristics and workpiece characteristics 702 transmitted from the machining information determination portion 102. During the machining, the adaptive control portion 103 conducts the adaptive control, analyzes the tool characteristics and the workpiece characteristics and compares this result with the assumed tool characteristics and workpiece characteristics 702. If they are greatly different from each other, it is judged that abnormality occurs, and the tool characteristics and workpiece characteristics 301 are transmitted to the machining data base 101 to be updated. Further, the re-determination request signal 701 that means that at least the machining conditions and the adaptive control characteristics as occasion demands are required to be re-determined is transmitted to the machining information determination portion 102. Upon receiving this signal, the machining information determination portion 102 re-determines at least the machining conditions and the adaptive control characteristics as occasion demands on the basis of the contents of the machining data base 101 which has been already updated at that time and transmits the re-determined result to the adaptive control portion 103. The adaptive control portion 103 conducts the adaptive control on the basis of the initial machining conditions and the adaptive control characteristics.

Therefore, even in the case where an abnormality occurs due to a change in the machining environment, the tool characteristics and the workpiece characteristics which are analyzed in real time during the machining are compared with the assumed tool characteristic and workpiece characteristic, thereby being capable of detecting the abnormality. In addition, at least the machining conditions and the adaptive control characteristics as occasion demands are re-determined on the basis of the analyzed tool characteristics and workpiece characteristics, thereby being capable of continuing the machining while preventing the abnormality.

In the above description, the abnormality is prevented after the abnormality has been detected. It is needless to say that it is sufficiently effective that the machining is interrupted as an alarm and only a message indication and the lighting of an abnormal lamp are conducted at the stage where the abnormality is detected. In addition, in this state, if a method to avoid abnormality is shown to the operator so that the machining is interrupted by the judgement of the operator or the method to avoid abnormality is applied to continue the machining, the safety is higher and the effect is high.

As described above, according to this embodiment, the adaptive control portion 103 judges that the abnormality occurs if the tool characteristics and the workpiece characteristics which are referred to in determination of the machining conditions in the machining information determination portion 102 are largely different from the tool characteristics and the workpiece characteristics which are analyzed in the adaptive control portion 103, respectively, and updates at least one of the information of the tool characteristics and the workpiece characteristics with respect to the machining data base. Also, the machining information determination portion re-determines the adaptive control characteristics and the machining conditions. Therefore, since the abnormality can be detected and prevented, the machining safe and high in reliability can be conducted.

The efficiency and the reliability can be improved.

Since the machining control system of the present invention comprises a machining data base for storing information necessary for determining initial machining conditions, machining information determining means for obtaining the initial machining conditions on the basis of the information stored in the machining data base and in accordance with adaptive control characteristics defined by adaptive control modes and adaptive control parameters and adaptive control means for controlling the machining in an appropriate state by changing the machining conditions in accordance with the machining states observed during the machining with the initial machining conditions as an initial value of the machining conditions, the efficiency and the reliability can be further improved.

The machining data base may store there in information on tool characteristics, workpiece characteristics, relational expressions of the machining states to the tool characteristics/the workpiece characteristics and the machining conditions, standard machining conditions and machining state target values. Because the initial machining conditions are determined in accordance with those various kinds of information and the adaptive control characteristics, the efficiency and the reliability can be further improved.

In the case where there are a plurality of selectable adaptive control characteristics, the machining information determining means may select the adaptive control characteristics such that any one of a machining period of time, a shape error, an abnormality occurrence rate and a tool wear amount becomes minimum among the plurality of adaptive control characteristics, and determines the initial machining conditions suitable for the adaptive control characteristics selected. Since the optimum adaptive control characteristics and the initial machining conditions are determined together, the efficiency and the reliability can be further improved.

The adaptive control means may analyze at least one of the tool characteristics and the workpiece characteristics on the basis of the machining states that is observed through the machining and the machining conditions, and updates at least one of the information of the tool characteristics and the workpiece characteristics which are retained in the machining data base. Because unknown or uncertain data within the machining data base is learned on the basis of the machining results, the optimum machining is conducted in accordance with the actual machining environment, and the troublesomeness of setting the data within the machining data base can be remarkably reduced.

The machining data base may be structured by characteristics inherent to the tools and the workpieces now used, characteristics common to the tools and the workpieces of the same lots as those of the tool and the workpiece now used, and characteristics common to all of the tools and the workpieces of the same kinds of the tools and the workpieces now used. Since the tools are classified into the tools (or workpieces) now used, the tools (or the workpieces) of the same lot as that of the tools now used and all of the tools (or the workpieces) of the same kind of that of the tools now used, and the data is retained, a reduction in the machining period of time and the higher reliability can be expected.

In the case where the machining is conducted first after the tools have been exchanged, the machining information determining means may obtain the machining condition such that the expected machining state does not exceed a machining state target value taking the characteristic common to the tools of the same lot or the same kind and a variation in the characteristic of the tools into consideration which are stored in the machining data base, and the machining conditions are determined as the initial machining conditions. Even if the workpieces have been exchanged, the data of the workpieces of the same lot or the same kind which is stored in the machining data base is effectively utilized, thereby being capable of determining the initial machining conditions safe and high in the efficiency.

In the case where the machining is conducted first after the workpieces has been exchanged, the machining information determining means may obtain the machining conditions such that the expected machining state does not exceed a machining state target value taking the characteristics common to the workpieces of the same lot or the same kind and a variation in the characteristic of the workpieces into consideration which are stored in the machining data base, and the machining conditions are determined as the initial machining conditions. Even if the workpieces have been exchanged, the data of the workpieces of the same lot or the same kind which is stored in the machining data base is effectively utilized, thereby being capable of determining the initial machining conditions safe and high in the efficiency.

The adaptive control means may judge that the abnormality occurs if the tool characteristics and the workpiece characteristics which are referred to in determination of the machining conditions in the machining information determining means are largely different from the tool characteristics and the workpiece characteristics which are analyzed in the adaptive control means, respectively, and updates at least one of the information of the tool characteristics and the workpiece characteristics with respect to the machining data base, and the machining information determining means re-determines the adaptive control characteristics and the machining conditions to prevent the abnormality. In the case where an abnormality occurs due to a change in the machining environment, the tool characteristics and the workpiece characteristics which are analyzed periodically during the machining are compared with the assumed tool characteristics and workpiece characteristics, thereby being capable of detecting the abnormality. In addition, at least the machining conditions and the adaptive control characteristics as occasion demands are re-determined, thereby being capable of conducting the machining safe and high in reliability.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A machining control system, comprising:
   a machining data base for storing information necessary for determining initial machining conditions, wherein the initial machining conditions include at least one of feed rate and feed pattern;
   machining information determining means for producing the initial machining conditions based on the information stored in said machining data base and in accordance with adaptive control characteristics defined by adaptive control modes and adaptive control parameters; and
   adaptive control means for controlling machining by changing machining conditions during machining in accordance with machining states observed during the machining with the initial machining conditions as initial values of the machining conditions, wherein the machining information determining means produces different initial machining conditions when the adaptive control characteristics are in an OFF state than when the adaptive control characteristics are in an ON state, so that machining load is decreased.

2. The machining control system as claimed in claim 1, wherein said machining data base stores information on:
   tool characteristics;
   workpiece characteristics;
   relational expressions of the machining states to the tool characteristics, the workpiece characteristics, and the machining conditions;
   standard machining conditions; and
   machining state target values.

3. The machining control system as claimed in claim 1, wherein, when there are a plurality of selectable adaptive control characteristics, said machining information determining means selects an adaptive control characteristic such that any one of a machining time, shape error, abnormality occurrence rate, and tool wear is minimized, among the plurality of adaptive control characteristics, and determines the initial machining conditions for the adaptive control characteristics selected.

4. The machining control system as claimed in claim 1, wherein said adaptive control means analyzes at least one of tool characteristics and workpiece characteristics based on machining states observed through the machining and the machining conditions, and updates at least one of the tool characteristics and the workpiece characteristics in said machining data base.

5. The machining control system as claimed in claim 1, wherein said machining data base includes characteristics inherent to a tool and a workpiece now used, characteristics common to the tools and the workpieces of common lots with the tool and workpiece now used, and characteristics common to tools and workpieces of the same kinds as the tool and the workpiece now used.

6. The machining control system as claimed in claim 1, wherein, when the machining is restarted after tools have been exchanged, said machining information determining means determines machining conditions such that an expected machining state does not exceed a machining state target value taking into consideration, from said machining data base, characteristics common to tools from the same lot or kind and variation in the characteristics of the tools, and determines machining conditions as the initial machining conditions.

7. The machining control system as claimed in claim 1, wherein, when the machining is restarted after workpieces have been exchanged, said machining information determining means produces machining conditions such that an expected machining state does not exceed a machining state target value taking into consideration, from said machining data base, characteristics common to workpieces of the same lot or kind and variation in the characteristic of the workpieces, and determines machining conditions as the initial machining conditions.

8. The machining control system as claimed in claim 1, wherein said adaptive control means determines that an abnormality has occurred if tool characteristics and workpiece characteristics referred to in determination of the machining conditions in said machining information determining means are significantly different from tool characteristics and workpiece characteristics analyzed in said adaptive control means, respectively, and updates at least one of the tool characteristics and the workpiece characteristics with respect to said machining data base, and said machining information determining means re-determines the adaptive control characteristics and the machining conditions to prevent the abnormality.

9. The machining control system as claimed in claim 1, wherein the machining states observed during the machining include tool and workpiece characteristics.

10. The machining control system of claim 1, wherein feed rate is an initial machining condition and when the adaptive control characteristics are in the OFF state a first feed rate is produced and when the adaptive control characteristics are in the ON state a second feed rate, faster than the first feed rate, is produced.

11. The machining control system of claim 1, wherein feed pattern is an initial machining condition and a different feed pattern is produced when adaptive control characteristics are in the OFF state than when the adaptive control characteristics are in the ON state.

12. A machining control system, comprising:
    a machining data base for storing tool characteristics and workpiece characteristics necessary for determining initial machining conditions;
    machining information determining means for predicting machining load at every moment during machining to determine the initial machining conditions so that a predicted load is less than a desired machining load, based on the tool characteristics and the workpiece characteristics stored in said machining data base and in accordance with adaptive control characteristics defined by adaptive control modes and adaptive control parameters; and
    adaptive control means for controlling machining by changing machining conditions during machining in accordance with machining states observed during the machining, with the initial machining conditions as initial values of the machining conditions.

* * * * *